US012755356B2

(12) United States Patent
De Souza Fioriti et al.

(10) Patent No.: US 12,755,356 B2
(45) Date of Patent: Oct. 6, 2026

(54) COMPUTER SCRIPT FOR PROCESSING IMAGES AND USE THEREOF IN A METHOD FOR FACIES IMAGE DETERMINATION

(71) Applicant: Petróleo Brasileiro S.A.—Petrobras, Rio de Janeiro (BR)

(72) Inventors: Lenita De Souza Fioriti, Rio de Janeiro (BR); Altanir Flores De Mello Junior, Niterói (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 570 days.

(21) Appl. No.: 18/012,454

(22) PCT Filed: Jun. 15, 2021

(86) PCT No.: PCT/BR2021/050259
§ 371 (c)(1),
(2) Date: Dec. 22, 2022

(87) PCT Pub. No.: WO2021/258170
PCT Pub. Date: Dec. 30, 2021

(65) Prior Publication Data
US 2023/0260090 A1 Aug. 17, 2023

(30) Foreign Application Priority Data
Jun. 24, 2020 (BR) ......................... 102020012943 0

(51) Int. Cl.
*G06T 5/77* (2024.01)
*E21B 47/002* (2012.01)
(Continued)

(52) U.S. Cl.
CPC .............. *G06T 5/77* (2024.01); *E21B 47/002* (2020.05); *G06T 5/20* (2013.01); *G06T 5/70* (2024.01);
(Continued)

(58) Field of Classification Search
CPC .... G06T 5/77; G06T 5/20; G06T 5/70; G06T 7/13; G06T 7/40; G06T 5/73;
(Continued)

(56) References Cited

U.S. PATENT DOCUMENTS 8,116,532 B2 2/2012 Morris
8,145,677 B2 3/2012 Al-Shameri
(Continued)

FOREIGN PATENT DOCUMENTS

CN 101950359 B 10/2012
WO 2009126881 A2 10/2009

OTHER PUBLICATIONS

Estimation of RQD by digital image analysis using a shadow-based method (Year: 2018).*
(Continued)

*Primary Examiner* — Jennifer Mehmood
*Assistant Examiner* — Pardis Sohraby
(74) *Attorney, Agent, or Firm* — Morrison & Foerster LLP

(57) ABSTRACT

The present invention refers to a computational script that aims to extract contour contrasts in images, to assist in the method for determining image facies The invention proposes a tool to highlight the heterogeneity of rocks for the identification of typical textural and structural patterns, being related to sedimentary facies.
Use the "Canny Edge Detection" algorithm and parameterizations in a computational language environment in Python, to extract the contour contrasts observed in profiles of the images captured from the rocks. Other results achieved by the invention correspond to the removal of artifacts, images overlapping and edge contrasts quantification. These results were incorporated into a method for determining image facies. In addition, the use of the products generated in
(Continued)

electrofacies, productivity and correlation prediction models between wells is promising. So the developed script provides important information for the oil industry.

16 Claims, 10 Drawing Sheets

(51) Int. Cl.
*G06T 5/20* (2006.01)
*G06T 5/70* (2024.01)
*G06T 7/13* (2017.01)
*G06T 7/40* (2017.01)
*H04N 5/265* (2006.01)

(52) U.S. Cl.
CPC .................. *G06T 7/13* (2017.01); *G06T 7/40* (2013.01); *H04N 5/265* (2013.01)

(58) Field of Classification Search
CPC .. G06T 2207/20192; G01V 2210/6169; G01V 2210/64; G01V 1/50; G01V 11/00; H04N 5/265; E21B 47/002; E21B 49/00; E21B 49/005
USPC .......................................................... 382/275
See application file for complete search history.

(56) References Cited

U.S. PATENT DOCUMENTS

| | | | | |
|---|---|---|---|---|
| 9,219,886 | B2 * | 12/2015 | Sooy | E21B 47/002 |
| 9,704,263 | B2 | 7/2017 | Elkington et al. | |
| 2018/0179881 | A1 * | 6/2018 | Thompson | G01V 11/002 |
| 2019/0072685 | A1 * | 3/2019 | Yang | G01V 1/168 |
| 2019/0338637 | A1 | 11/2019 | Francois et al. | |
| 2021/0407156 | A1 * | 12/2021 | Hu | G01V 3/18 |
| 2022/0358693 | A1 * | 11/2022 | Connell | G06T 11/005 |
| 2023/0145880 | A1 * | 5/2023 | Solum | G06F 18/2431 382/173 |

OTHER PUBLICATIONS

Canny, John F. (Mar. 23, 2009) "Canny Edge Detector", 7 pages.
Choquehe et al. (Feb. 1970) "Geologic Nomenclature and Classification of Porosity in Sedimentary Carbonates", The American Association of Petroleum Geologists Bulletin, 4(2):207-250.
Jesus et al. (Dec. 2016) "Permeability Estimation Using Ultrasonic Borehole Image Logs in Dual-Porosity Carbonate Reservoirs", Petrophysics, 57(6):620-637.
Terra et al. (2010) "Classificacao De Rochas Carbonaticas Aplicavel as Bacias Sedimentares Brasileiras", Boletim de Geociencias—Petrobras, 18(1):9-29.
Cavallero Martins et al. "Estudo de Deteccao de Bordas em Imagens Usando Kernel," XXXIII Brazilian Symposium on Telecommunications (SBrT2015), Sep. 2015, Juiz de Fora, Brazil; pp. 1-2.
De Souza Fioriti et al., International Search Report and Written Opinion mailed Aug. 16, 2021, directed to International Application No. PCT/BR2021/050259; 15 pages.
Santos et al. "Identificacao de Facies em Perfis de Poco com Algoritmo Inteligente," VIII Brazilian Symposium on Geophysics, Sep. 18-20, 2018, Salinópolis, Brazil; pp. 1-6.
Bal et al. (Oct. 2001). "Borehole Image Log Interpretation: Making the Most of Your Data and Realising the Limits, an Illustration Using Fluvial, Shallow Marine, and Deep Marine Environments," 28th Annual Convention Proceedings of the Indonesian Petroleum Association 1:665-670.
Fioriti et al. "Image facies interpretation and the use of computational scripts in image processing," 1st Petrobras Petrophysics Seminar, Feb. 2-May 5, 2019, Rio de Janeiro, Brazil; 9 pages (18 pages with translation).

* cited by examiner

COMPUTER SCRIPT FOR PROCESSING IMAGES AND USE THEREOF IN A METHOD FOR FACIES IMAGE DETERMINATION

CROSS-REFERENCE TO RELATED APPLICATIONS

This application is a national stage application, filed under 35 U.S.C. § 371, of PCT International Patent Application No. PCT/BR2021/050259, filed Jun. 15, 2021, and entitled "COMPUTER SCRIPT FOR PROCESSING IMAGES AND USE THEREOF IN A METHOD FOR FACIES IMAGE DETERMINATION," and claims benefit of and priority to BR Application No. 10 2020 012943 0 filed Jun. 24, 2020, the disclosures of all of which are incorporated herein by reference in their entirety.

FIELD OF INVENTION

The present invention refers to a computational script for treating image, which allows highlighting textural and structural variations of the rock, by extracting edge contour contrasts, removing artifacts (non-geological features present in the image profiles) and superimposing images, in addition to enabling the quantification of edge contrasts. These products can be used in a method for determining facies from image profiles.

DESCRIPTION OF THE STATE OF THE ART

Electrical and ultrasonic imaging profiling tools capture a large amount of high-resolution data around a well wall. One of the objectives of this type of profile is the recognition and interpretation of geological events, through the correlation of measurements carried out in the subsurface with geological data. This information allows the formation geological characteristics to be described in detail, favoring sedimentological, stratigraphic, structural, geomechanical, petrophysical analyses, and the characterization of the reservoirs.

Image profiles are very susceptible to artifacts, some of which can be minimized or repaired if identified in time. Therefore, control during the acquisition of image profiles is important to ensure the best possible data quality and add reliability to the formation interpretations and evaluation.

The high-quality profile image combined with the rock data provides an excellent tool for faciological and structural analysis. Integrating this data to the results of formation tests adds great value to the geological model.

The study of facies based on image profiles considers the texture and sedimentary structures of the rock observed in the image and, from the geological knowledge of the area and the interpreter experience, generates the visual association between litho-facies and image facies The faciological description used (litho-facies and image facies) usually follows the classification by Terra et al., Classifição de Rochas Carbonáticas Aplicável às Bacias Sedimentares Brasileiras. Boletim de Geociências da Petrobras (BGP), 2010. For more detailed interpretations, as proposed in Reading, *Sedimentary environ-ments: process, facies and stratigraphy.* 3*rd Edition, Blackwell, Oxford,* 1996, additional analyzes such as diagenesis, volume and type of clay mineral, and primary structures would be necessary.

Rock x profile integration helps in characterizing the potential of the reservoir around the well wall. Formation tests provide information about the flow model of the reservoir for distances beyond the well wall. The integration of these data increases the accuracy of geological and reservoir flow models, which in turn enhances field development and production management.

Due to the high cost associated with extracting rock testimonies, the use of image profiles in faciological interpretations is of fundamental importance. To do this, it is also essential that the image has good quality and good resolution, which is optimized by geological following up during profiling.

Seeking ways to improve the image profiles used in faciological interpretations adds value to the final product and gives reliability to the geological model.

Image treatments that seek to extract the contrasts contours of observed edge correspond to an important tool for the generation of products that help in the characterization of image facies and in the rock x profile correlation. These edge contrasts represent textural and structural facies variations, as well as mega-giga porosities or artifacts.

A mega pore is understood to be a pore size between 0.4 cm and 25.6 cm, as shown in the work by Choquete, P. W; Pray L. 1970. Geologic Nomenclature and Classification of Porosity in Sedimentary Carbonates. The American Association of Petroleum Geologists Bulletin. Vol. 5, pp. 207-250, and gigapores sizes greater than 25.6 cm, as presented in Menezes de Jesus, C; Compan, A. L; Surmas, R; 2016. Permeability Estimation Using Ultrasonic Borehole Image Logs in Dual-Porosity Carbonate Reservoirs. In: Petrophysics, Vol 57, pp. 620-637.

It is emphasized that the rock is the direct and irreplaceable source of information about the formation. However, it is important to obtain means of extracting as much information as possible about it. This information can be used for rock x profile calibration, different types of correlations, and as a quality control/beacon in works involving predictions.

In view of the need to reduce operating costs and extract as much information from image profiles as possible, the work by Bal et al., 2001, sought to apply a method for determining facies from the image profile. Since then, the method has been improved and applied in wells profiled by Petrobras.

In the work of Fioriti & Mello Jr, 2018, computational scripts programmed in Python, capable of extracting the edge contrast contours observed in any type of image, with the objective of highlighting the heterogeneities of the rocks for the identification of typical textural and structural patterns, which can be related to sedimentary facies, were developed.

Given the importance of identifying textural and structural patterns in facies interpretations and, due to the fact that some sedimentary structures are more evident in the image profile, tomographic image or testimony, it was identified the importance of improving a way of visualizing these textural variations and structural elements in any type of image.

Conventional image editing programs have tools that highlights edge contours in images. However, these programs were not developed with the intention of generating value for the oil industry, the objective of this invention. Therefore, they do not provide the same results and the same products as the script developed in the present invention provides. An important innovation of this invention is the quantification of edge contrasts.

Commercial software Techlog, IP, Geolog, used for processing and interpreting image profiles, do not have image treatment modules that provide the results that the script developed in the present invention provides.

The "Canny Edge Detection" algorithm (Canny, J. F.; 1986) is present in the OpenCV library, which is used in programming software in Python. In order to carry out this invention, the OpenCV library was used and, by means of the personalized algorithm parameterization, an attempt was made to extract the edge contour contrasts observed in the image (that is, acoustic and resistive image profiles, tomographic image or testimonial photos, lateral sample, thin slide, as presented in the work by Fioriti & Mello Jr, 2018.

The improvement of this invention allowed other objectives to be achieved, such as the removal of tool marks (artifact), which make it difficult to visualize the texture and structure of the rock; the superimposition of the original image with the detected edges, which further highlights the heterogeneities of the rock, and the quantification of edge contrasts identified by depth. This information has different application possibilities, from the correlation with lithological variations to the correlation with data from other profiles and results of formation tests.

Document WO2009126881A2 reveals a method for generating three-dimensional (3D) models of rocks and pores, known as numerical pseudonuclei. The method uses full circle images of the well wall, digital rock images and algorithms with continuous variables developed within the scope of multipoint statistics (MPS) to reproduce three-dimensional (3D) pseudonuclei for the recording interval, where the real nucleus was not removed, but there are boreholes images obtained from the log. Therefore, the applied method does not use the "Canny Edge Detection" algorithm in a Python computational language environment, such as that of the present invention.

Document US20190338637A1 discloses a method for determining a property of a geological formation based on an optical image of rock samples taken from the formation. The image comprises a plurality of pixels and the method consists of defining windows in the image, each window comprising a predetermined number of pixels and being of a predetermined shape. The method also includes, for each window, the extraction of a representative rock impression value of the window. A rocky impression comprises indicators to characterize a window texture. The method also includes sorting the windows into categories from a predetermined set. However, the applied method does not use the "Canny Edge Detection" algorithm in a Python computational language environment, such as that of the present invention.

The document "Identificação de Fácies em Perfis de Poço com Algoritmo Inteligente—Santos, Renata de Sena, UFOPA; Andrade, André José Neves, UFPA" reveals a solution to identify lithological facies in well profiles presenting two methods: the Vsh-L-K Graph and the generalized angular competitive network. Although employed methods do not use the "Canny Edge Detection" algorithm in a Python computational language environment, such as that of the present invention.

The document "Estudo de Detecção de Bordas em Imagens Usando Kernel—Bruna Cavallero Martins, Matheus Fuhman Stigger, Wemerson Delcio Parreira" reveals an application of Kernel functions in the problem of edge detection in images. Although the present invention has a Kernel filter, the document does not mention a configuration that uses the "Canny Edge Detection" algorithm in a Python computational language environment, such as this invention.

As can be seen, the State of the Art does not have the unique characteristics of this invention that will be presented in detail below. A defined procedure was not identified to extract the contour contrasts observed in profiles of images captured from rocks in a Python computational language environment, such as the present invention.

The effectiveness of the invention is proven in the identification of textural and structural patterns, which are essential for rock x profile correlation and facies identification.

The effectiveness of this invention has also been verified in removing artifacts. Specifically, the tool mark artifact was removed without impairing the identification of rock structures and textures. On the contrary, removing this artifact improves the visualization of geological features. This application is an important innovation, since there is still no available process that provides this result with quality.

Favorable results were also obtained with the application of the invention in the quantification of the edge structures by depth. This is important for tomographic profiles, image profiles and photos testimony. The identified heterogeneities can be related to textural variations and the presence of mega and giga pores, aiding in facies and productivity analyses. Knowing that these edge contrasts can also represent artifacts that were not removed (such as, for example, breakouts, cable marks, drill marks, among others), the quantification of edge contrasts can be a way for the interpreter to quantify the quality of the image in terms of the occurrence or not of artifacts.

BRIEF DESCRIPTION OF THE INVENTION

The development and improvement of computational scripts that aim to extract contour contrasts in images help in the interpretation of image facies. The textural and structural variations are highlighted, which facilitates the identification of typical patterns.

In this invention, a tool was developed with the initial objective of highlighting the heterogeneity of the rocks to allow the identification of typical textural and structural patterns, which can be related to sedimentary facies.

The invention used the "Canny Edge Detection" algorithm in a computational language environment in Python, in order to extract the edge contour contrasts observed in captured images of the rocks.

The improvement of this invention allowed other objectives to be achieved, such as the removal of artifacts, the superimposition of the original image with the detected edges, and the quantification of edge contrasts identified by depth.

BRIEF DESCRIPTION OF DRAWINGS

The present invention will be described in more detail below, with reference to the attached figures which, in a schematic and not limiting of the inventive scope, represent examples of its realization. In the drawings, there are.

DETAILED DESCRIPTION OF THE INVENTION

The present invention relates to the development of a computational script for the treatment of image profiles, allowing to highlight textural and structural variations of the rock in any type of image. This information can be used in a method for determining facies.

The invention used the "Canny Edge Detection" algorithm in a computational language environment in Python, in order to extract the edge contour contrasts observed in captured images of the rocks.

Figure 1A:
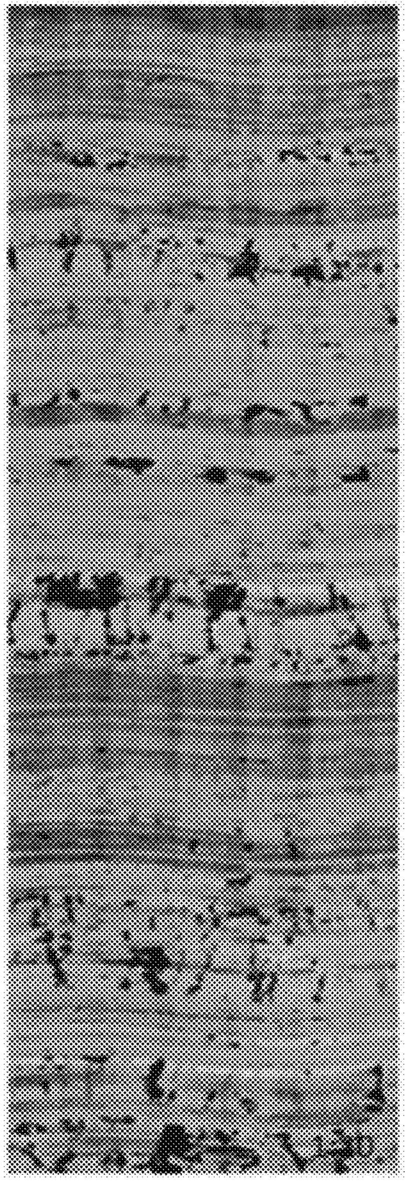
FIG. 1A illustrates that the algorithms for extracting edge contrasts highlight the structure contours that may represent textural and structural facies variations, which corresponds to the acoustic image profile.
Figure 1B:
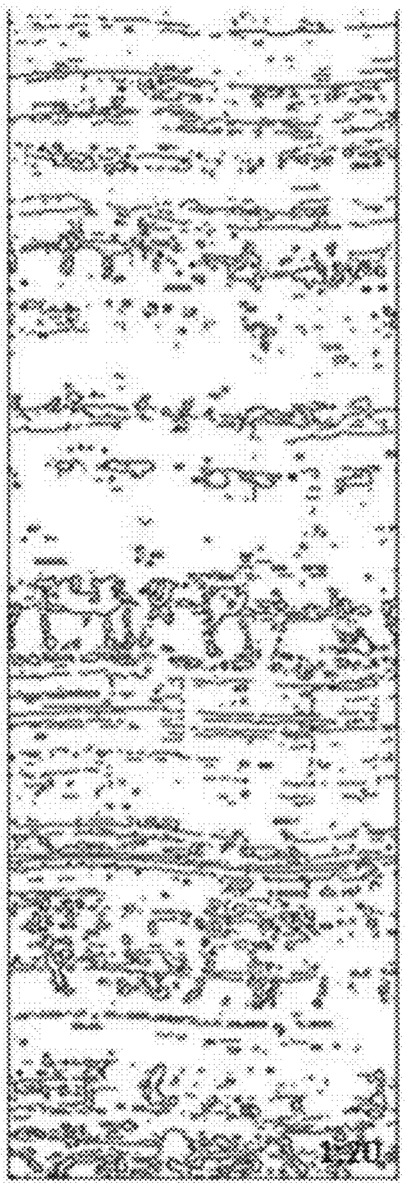
FIG. 1B illustrates that the algorithms for extracting edge contrasts highlight the structure contours that may represent textural and structural facies variations, which corresponds to the image with edges detected.
Figure 2A:
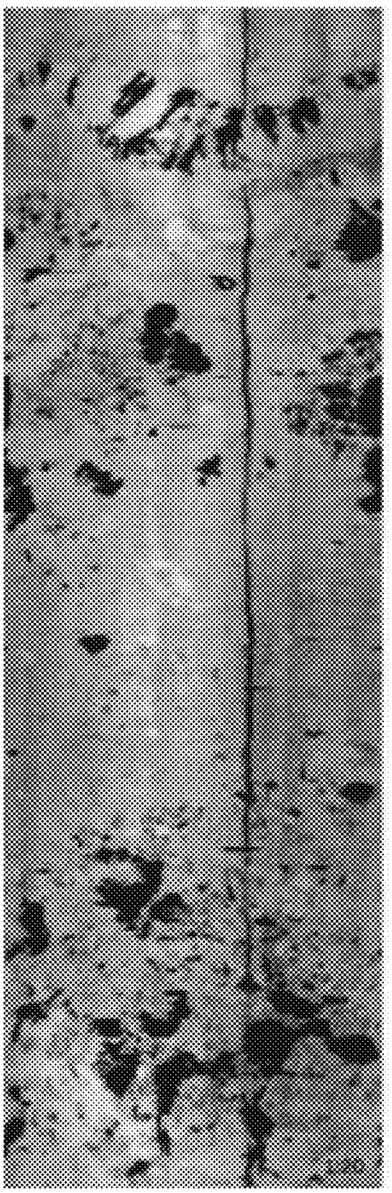
FIG. 2A illustrates the occurrence of mega-giga pores that corresponds to the acoustic image profile, which may be associated with some specific lithology. Furthermore, the occurrence of artifacts must be minimized during data acquisition and processing. The objective is that the detection of the edge artifact contrasts does not impair the faciological interpretation. Note that the occurrence of the cable mark (artifact) was detected.
Figure 2B:
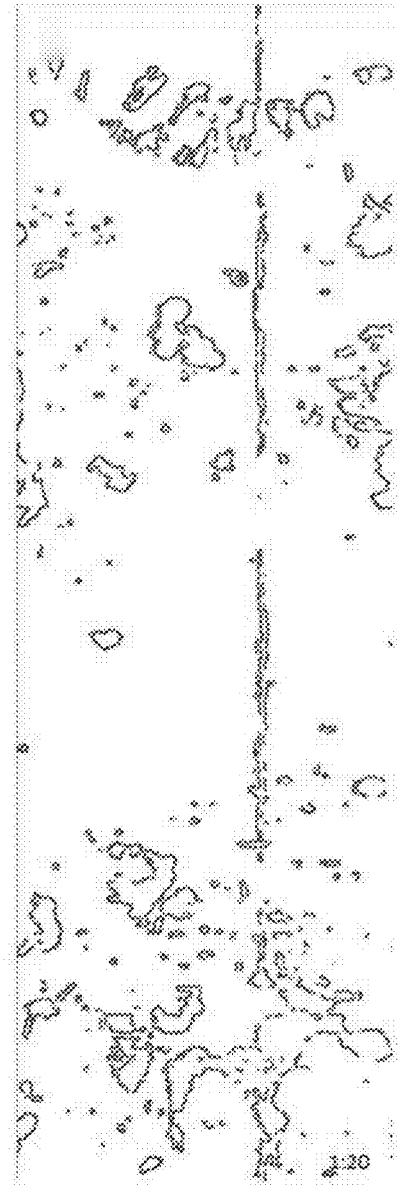
FIG. 2B illustrates the occurrence of mega-giga pores that corresponds to the image with edges detected, which may be associated with some specific lithology. Furthermore, the occurrence of artifacts must be minimized during data acquisition and processing. The objective is that the detection of the edge artifact contrasts does not impair the faciological interpretation. Note that the occurrence of the cable mark (artifact) was detected.
Figure 3A:
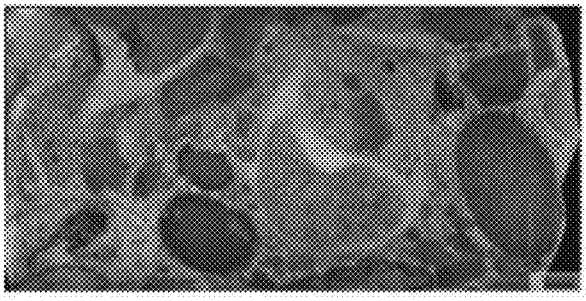
FIG. 3A illustrates photos of lateral samples.
Figure 3B:
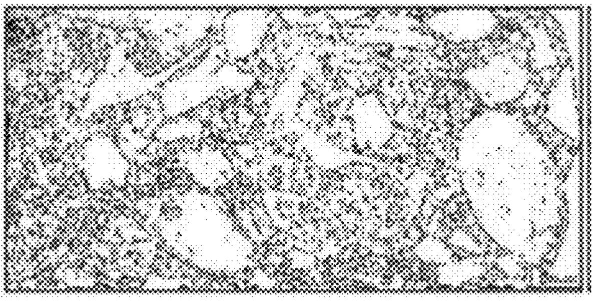
FIG. 3B illustrates that edge contrasts from the photos of the lateral samples shown in FIG. 3A, highlighting textural differences of facies components.
Figure 3C:
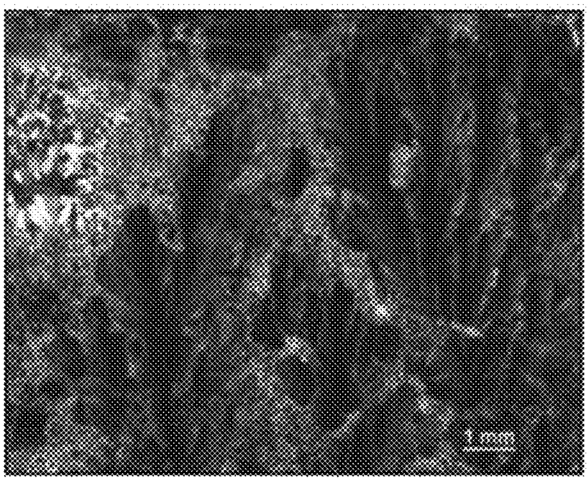
FIG. 3C illustrates photos of petrographic slides.
Figure 3D:
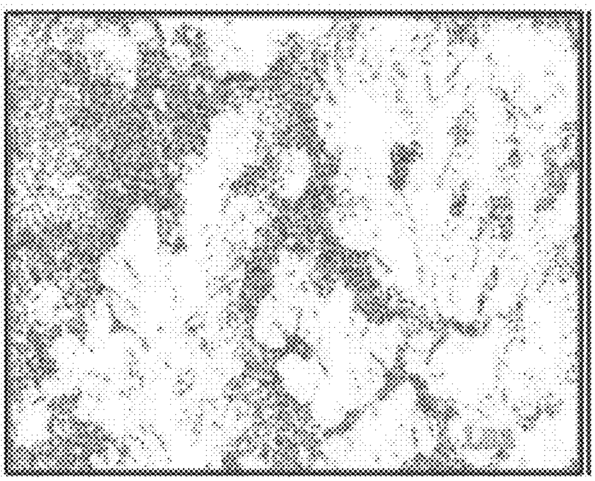
FIG. 3D illustrates that edge contrasts can also be extracted from photos of the petrographic slides shown in FIG. 3C, highlighting textural differences of facies components.

Image treatments that provide edge contour contrasts are important, as they highlight the heterogeneities that can allow the identification of textural and structural patterns (FIGS. 1A-1B). These variations represent facies changes and help in the interpretation of image facies Edge contrasts can also represent mega-giga pores or artifacts (FIGS. 2A-2B).

Image quality is essential so that edge contrasts represent textural and structural variations, emphasizing features present in image profiles, tomographic image or testimonial photo, lateral sample and thin slides (FIGS. 3A-3D). Consequently, the generated product may help in the characterization of image facies and in the rock x profile correlation.

Method Used to Perform the Rock x Profile Correlation

Figure 4:
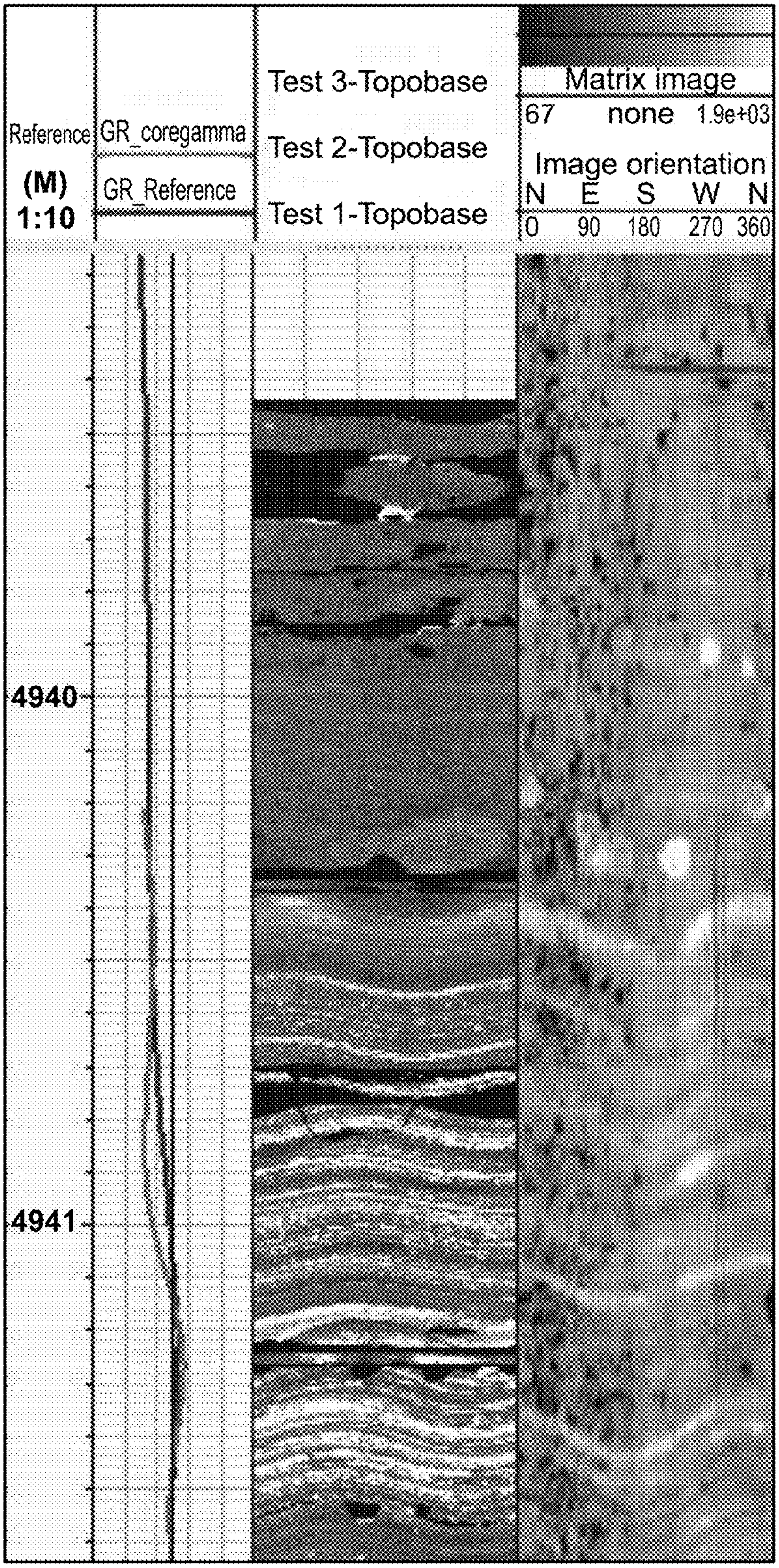
FIG. 4 illustrates the depth adjustment of the tomographic profile with the acoustic image profile, through the correlation between the Gamma Ray profile (Image) and the coregamma curve (testimony), in addition to the fine adjustment based on textural variations and structures observed.

The method used to determine facies from high resolution image profiles comprises the following steps:

a) Acquisition of computed tomography and generation of the tomographic profile;

b) Data acquired in wells are referenced by their depth, which is determined by measuring the length of the cable as it enters and leaves the well. This is done by means of cable rotation measurements close to the profiling unit. However, due to the cable's ability to stretch and the tool's interaction with the well wall roughness, the registered depth may not be the real one. The depth of the first profiling run is considered as a reference, as the cable is less deformed. Therefore, the depth adjustment of the profiles must be carried out through the correlation between the coregamma curve measured in the laboratory and the reference gamma-ray curve of the first profiling run;

c) Since the resolution of the image profile is greater than that of the curve gamma ray and image profiles may have artifacts, after processing the image profiles it may be necessary to perform a depth fine adjustment thereof. This fine adjustment of the depth is carried out through the correlation of textures and geological surfaces observed in the image profile and in the tomographic profile or testimony (FIG. 4);

d) In addition to the testimony, the lateral sample corresponds to another source of direct information about the rock. Lateral samples are taken from pre-established depths. Due to operational issues, the sample is not always taken from the exactly predicted depth. The cavity left by lateral rock sampling is well determined in the image profile. For this reason, it is possible to perform the repositioning of the lateral samples and indicate exactly the depth from which they were taken. It is very important to carry out this repositioning of the lateral samples;

e) the calibration of previously described facies and (re)description (when necessary) of testimonies, combined with the description of thin sections. From this stage, the use of the results provided by the script developed in this invention adds value to the method for determining image facies f) Interpretation of facies in the acoustic image profile (image facies);

g) Extrapolation of image facies for the depths of untestimonied and unsampled intervals (that is, between lateral samples).

Figure 5A:
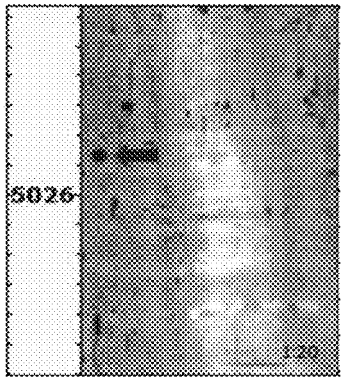
FIG. 5A illustrates that the repositioning of a lateral sample is performed through the marks observed in the acoustic image profile (indicated by an arrow)
Figure 5B:
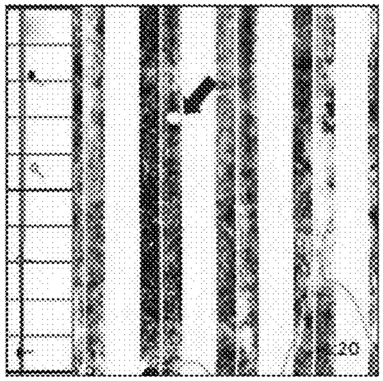
FIG. 5B illustrates that the repositioning of a lateral sample is performed through the marks observed in the resistive image profile—oil-based drilling fluid (indicated by an arrow)
Figure 5C:
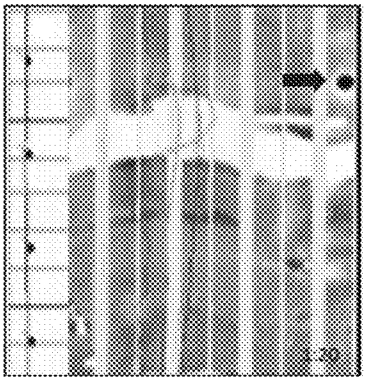
FIG. 5C illustrates that the repositioning of a lateral sample is performed through the marks observed in the resistive image profile—water-based drilling fluid (indicated by an arrow)

If there is no tomographic profile available, the procedure starts from the depth adjustment of the gamma ray profile (image) and the coregamma curve (testimony). If there is no testimony, the procedure begins with the repositioning of the lateral samples, which is performed by adjusting the depths measured by the probe and the marks observed on the image profile, which is used as a reference (FIGS. 5A-5C). The result of the depth adjusting of lateral samples is not always reliable, since for the same depth there may be several attempts to collect lateral samples (information indicated in the profiling report). The presence of mega-giga pores (like vugs), fractures and/or breakouts) increases the uncertainty as to the correct position of the sample. One way to increase the accuracy of repositioning the lateral samples is to correlate basic petrophysics data (porosity and permeability) and other profiles, such as magnetic resonance and neutron, with the marks observed in the image profiles. After repositioning the sample, the basic petrophysics data must also have their depths adjusted.

After calibrating the textural patterns for the different facies, taking into account the diagenesi actuation, the image facies are extrapolated to the entire well. This calibration is performed through textural and structural comparison between the rock data and the image profile for the different lithologies. There is greater uncertainty associated with regions where there is no core, where there are doubts regarding the description of the lateral samples, where diagenesis obliterates the original recognition of the rock, and where artifacts and image profile quality impair the definition of the image facies It is noteworthy that, in addition to the calibration of the image profile with the rock data, the integrated analysis with the other profiles, such as, for example, the profiles of density, neutron, sonic, caliper, photoelectric factor, resistivity, magnetic resonance, spectral gamma rays and lithogeochemistry, help in the characterization of the image facies The description of the lateral samples provides greater reliability for the interpretation and extrapolation of the facies.

Extraction of Contour Contrasts in Images

The "Canny Edge Detection" algorithm available in programming code libraries is intended to extract contour contrasts observed in images, through the following operations:

1) Noise Reduction by Applying a 5×5 Gaussian Filter

Once the "Canny Edge Detection" algorithm is likely to noise in the image, it is necessary to remove the noise by applying a Gaussian filter (1). This filter works to smooth the image and subsequently remove noise and details.

$$G(x) = \frac{1}{\sqrt{2\sigma^2}} e^{-\frac{x^2}{2\sigma^2}} \tag{1}$$

Equation 1 represents a Gaussian function for one dimension, where G(x) corresponds to the Gaussian distribution of the values of x, ρ corresponds to the standard deviation of the values of x (such that ρ>0) and x corresponds to the set of n values (such that −∞<x<∞)

2) Calculation of the Image Intensity Gradient

The smoothed image is further analyzed in terms of its intensity in the horizontal $G_x$ direction and vertical $G_y$ direction. The intensity gradient (Edge gradient) is calculated from the application of a Sobel Kernel filter for each pixel in the image, which results in the direction of greatest variation from light to dark and the variation quantity in that direction. The gradient direction is always perpendicular to the edge and is rounded to one of four angles, representing the horizontal, vertical, and two diagonal directions. Therefore, the image intensity gradient has magnitude (2) and direction (3).

$$(G) = \sqrt{G_x^2 + G_y^2} \tag{2}$$

Equation 2 represents the magnitude G of the image intensity gradient, calculated from its intensity in the horizontal $G_x$ direction and in the vertical $G_y$ direction.

$$(\theta) = \tan^{-1}\frac{G_y}{G_x} \tag{3}$$

Equation 3 represents the 6 direction of the intensity gradient of the Image.

3) Elimination of Pixels that do not Correspond to a True Edge.

After obtaining the magnitude and direction of the gradient, a complete analysis of the image is performed in order to remove pixels that do not constitute an edge. Each pixel is evaluated whether it constitutes a local maximum with respect to its neighbors in the gradient direction.

Figure 6:
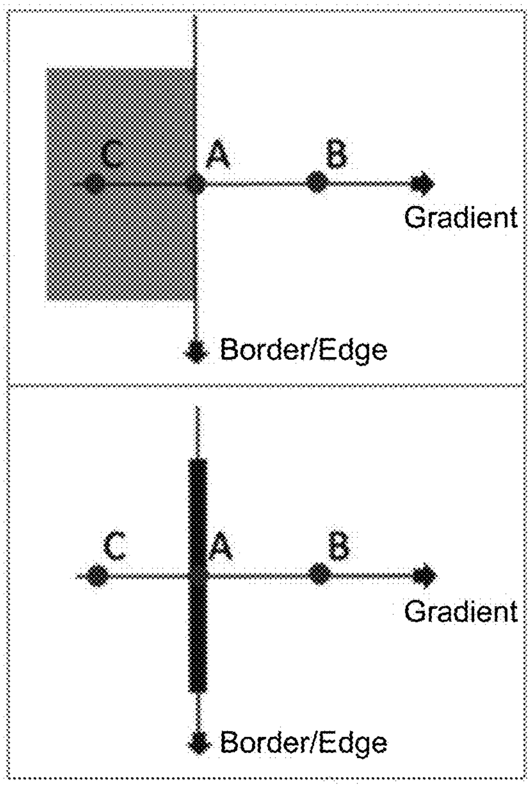
FIG. 6 illustrates the pixels classification in the image, suppressing those that do not correspond to local maxima. If point A is a local maximum, it will be considered as belonging to an edge.

In FIG. 6, point A corresponds to an edge in the vertical direction, with the gradient direction being perpendicular to it. Points B and C are in the gradient direction. Point A is compared to points B and C in order to verify if it corresponds to a local maximum. If it matches, point A is considered an edge and it proceeds to the next stage.

Otherwise, point A will be suppressed (zeroed value). The generated product is a binary image with detected edges.

4) Hysteresis Limitation.

This step defines which previously selected edges are really edges and which are false positives. For this, it is necessary to insert two parameters, which will constitute lower and upper limits. Pixels with intensity gradient values greater than the upper limit are considered belonging to true edges, and those with values smaller than the lower limit are not considered an edge, being discarded. Pixels with intermediate values will be analyzed according to their connectivity with neighbors pixels. If the pixel has a connection with a true edge pixel, it will be considered an edge. If it is disconnected, it will be discarded.

Figure 7:
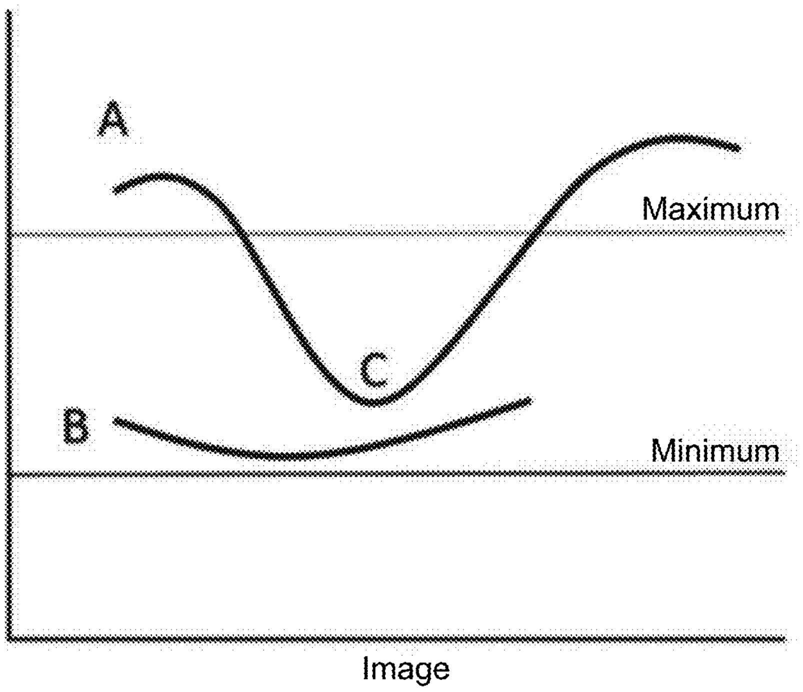
FIG. 7 illustrates the local hysteresis. Values above the upper limit are considered true edges. Values between the upper and lower limits are considered edges if they are connected to true edges. If they are disconnected, they are discarded. Values below the lower limit are also discarded.
Figures 8A, 8B, 8C, 8D, 8E:
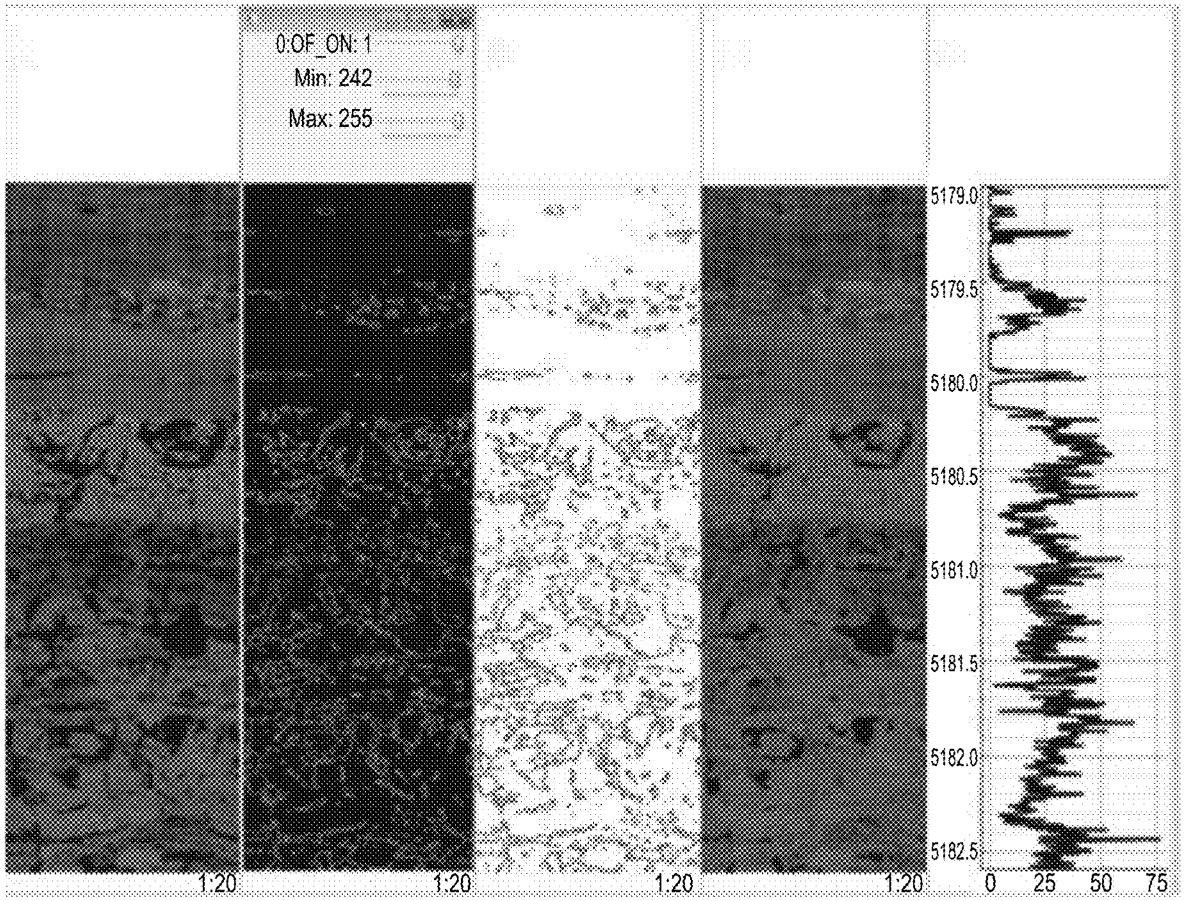
FIG. 8A illustrates an exemplary original image where the products obtained from the script developed in this invention can be derived from. The original image (A) has its edges extracted (C), from limits defined by the user (B), being possible to make an overlap of the edges with the original image (D). The detected edge density is also provided (E)
FIG. 8B illustrates the original image shown in FIG. 8A with its edges extracted.
FIG. 8C illustrates the limits defined by a user for the extracting the edges as shown in FIG. 8B.
FIG. 8D illustrates an overlap of the edges with the original image shown in FIG. 8A.
FIG. 8E illustrates the detected edge density.

In FIG. 7, portion A of the edge is above the upper limit, so it is considered a true edge. Although the portion C is between the lower and upper limits, its connectivity with the portion A allows it to be considered a true edge. Portion B, despite having a value close to that of C, does not have connectivity with any true edge, being discarded.

"Canny Edge Detection" Algorithm Available in the OpenCV Library and Developed Script.

The "Canny Edge Detection" algorithm is present in the OpenCV library, used in Python programming software. Through personalized parameterizations in the "Canny Edge Detection" algorithm, we sought to extract the edge contour contrasts observed in the image (that is, image profiles, tomographic image or testimonial photos, lateral sample, thin slide). The aim was to highlight textural and structural variations to aid in the interpretation of image facies.

The developed script allows, in its most recent version, to work with the images of the well sequentially, as long as certain conditions are observed, such as format (*.PNG) and standardization of the file name. After import, you can analyze them in terms of their resolution in DPI, height and width in pixels and/or inches, as well as making it available for Sobel Kernel filter application. This filter aims to smooth the image by eliminating noise. It is possible to plot the generated image and modify the color scale.

Subsequently, the upper and lower limits for detecting edge contrasts are defined by the user, in order to enhance textural and structural variations in the image. The same limits can be applied to all imported images, or the user can indicate the most appropriate values for each case. After defining the upper and lower limits, the script can be activated only once to generate all products.

The image of the detected edges can be viewed individually, as well as superimposed on the original image (overlap image). In order to quantify the information, the data of the edge density detected are exported in a *.txt file, as well as the graph of this data in *. PNG format.

Therefore, the products generated by the script are the edges image, the overlap image, the edge density image, and a file in *.txt format (FIGS. 8A-8E).

Results

The linking image profile x testimony is carried out by adjusting the testimony depth in relation to the coregamma curve and the textural and structural variations observed in the acoustic image profile and/or resistive image profile. From the facies described in the testimonies, calibration can be performed between the textures, structures and amplitudes observed in the image profiles and tomographic image, which will help in determining the image facies When integrating this information with data from other profiles, petrographic slides descriptions and laboratory petrophysics results, it may be necessary to reinterpret the facies in relation to what was described in the database.

Figure 9A:
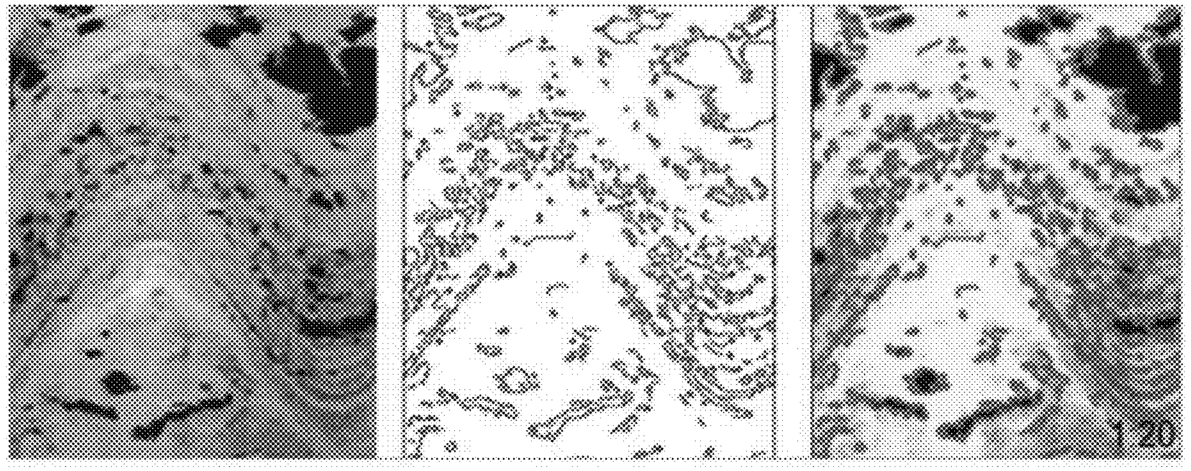
FIG. 9A illustrates stromatolites observed in an acoustic image profile (image facies) that corresponds to the laminated stromatolite with porosity following the preferred path of the laminae, with contour contrasts highlighted through image processing in Python.
Figure 9B:
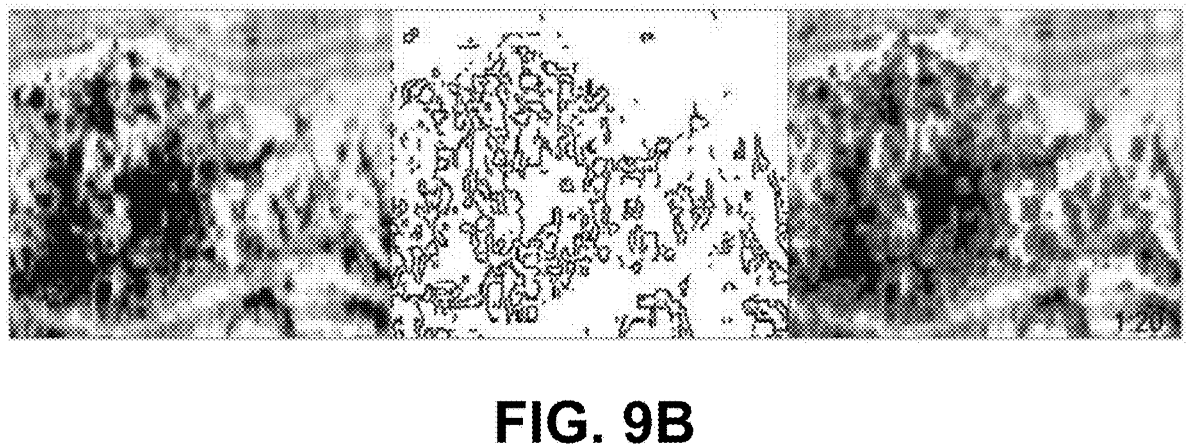
FIG. 9B illustrates stromatolites observed in an acoustic image profile (image facies) that corresponds to the stromatolite with vugular porosity marking the geometry of the stromatolite and an internal arrangement apparently more catotic (more pervasive), with contour contrasts highlighted through image processing in Python.

Stromatolites have conical, dome and/or laminated shapes. In the image profile, the stromatolite may present slides formed by small elements. The region of low amplitude (porosity) can follow a preferred path determined by these slides, which correspond to the growth levels of the elements (FIG. 9A). Vugular porosities, on the other hand, occur randomly and with an apparently more chaotic internal arrangement (FIG. 9B), unless they are the result of increased inter-element porosities resulting from the dissolution process and will show the geometry of the stromatolite.

The spherulites have a fine granular pattern, which can be obliterated if there is intense cementation and/or clayeyness. In general, in the image profile, the spherulitic tends to present a laminated structure or a more homogeneous aspect when diagenesis is active, as well as when the spherulites have dimensions below the resolution of the tool. It usually has a very fine granular texture or fine texture. The distinction with the laminite facies is not always evident.

Figure 10:
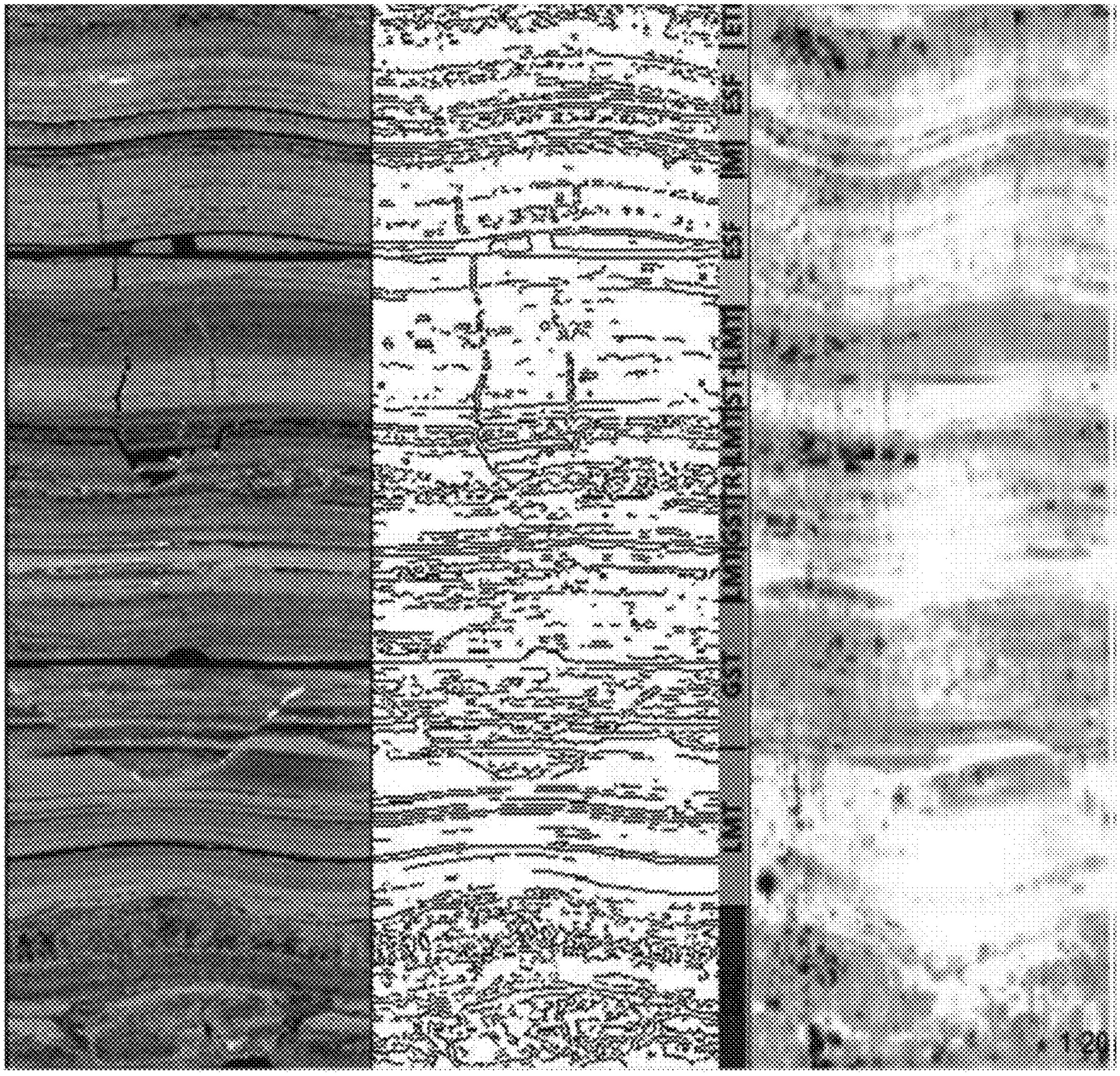
FIG. 10 illustrates deposits in situ interspersed with reworked deposits. Finely laminated laminites (LMT), with incipient or even absent lamination (due to the thickness below the resolution of the tool). Spherulithite (ESF) with high amplitude (closed) and fine to very fine granular texture. Stromatolites (STR) with low amplitude and porosity following preferential path determined by slides (levels of element growth) and random vugular porosity (unless resulting from increased interelement porosities by dissolution). Grainstone (GST) with low amplitude and granular texture. In general, they are porous, except at more closed levels, where the amplitude of the acoustic image profile is greater.

Laminites tend to have continuous slides. Its identification depends a lot on the rock x profile correlation. The carbonate sludge present as a constituent of clayey laminites and spherulites can obliterate the pores and particles, making their differentiation difficult. In these cases, the contrast is relatively better marked in laminite due to the presence of siliciclastic material and carbonate material, which present different impedance responses. In the acoustic image profile, laminites are characterized by intercalation of layers with amplitude contrast, with incipient or even absent lamination (due to the thickness of the slide being below the tool resolution). The in situ deposits can occur interspersed with each other or with reworked facies (FIG. 10).

Figure 11B:
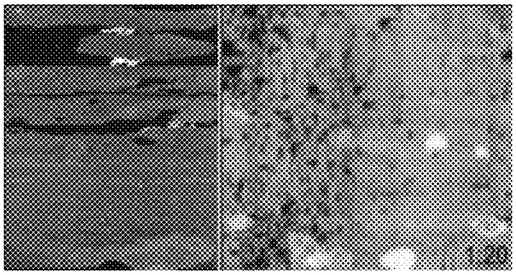
FIG. 11B illustrates reworked deposits that correspond to Rudstone (RUD)
Figure 11A:
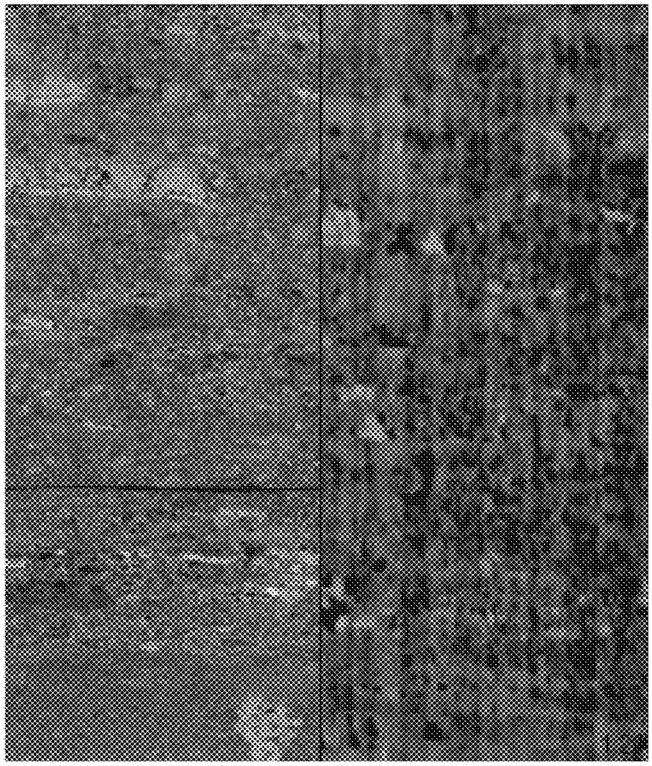
FIG. 11A illustrates reworked deposits that correspond to the granular texture and has pores with low amplitude.
Figure 11C:
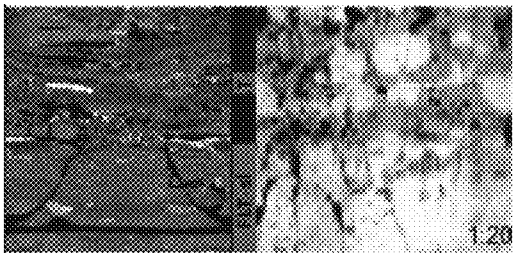
FIG. 11C illustrates reworked deposits that correspond to Floatstone silicified (FLT-sl) intercalated with RUD with low amplitude.
Figure 11D:
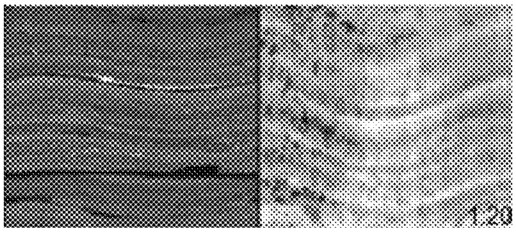
FIG. 11D illustrates reworked deposits that correspond to Grainstone (GST) stratified.

The reworked facies (rudstones floatstone and grainstone) have a predominantly granular texture with low (FIG. 11A) or high amplitude. Low amplitude indicates rough and porous wall. Layers and nodules of greater amplitude correspond to dense layers (that is, cemented or silicified). The rudstones with very coarse granulometry to granules have a clear granular texture (FIG. 11B). The floatstones with thin grainstone matrix may present responses similar to those of rudstones (FIG. 11C). The grainstones present relatively more discreet granular texture than the rudstones. However, the distinction between these facies is not always evident, especially when the profile resolution is low, or when diagenesis acts, obliterating the original texture of the rock. The reworked deposits can have a laminated, stratified or massive structure. The presence of stratified grainstone, for example, is characterized by the existence of layers with amplitude contrast resulting from granulometric variation. Layers comprising coarser and more porous grains have low amplitude. Layers comprising finer grains and more closed (less porous) present high amplitude (FIG. 11D).

Carbonate breccias are associated with exposure, weathering and erosion. These processes tend to eliminate the forms that gave rise to the facies. The entry of silica by hydrothermal fluids also deforms and cause breccias in the pre-existing deposits, generating a high amplitude response in the acoustic image profile. Breccias present a chaotic texture, which may or may not preserve the original lamination of the rock. When it is possible to define the rock protolith in the testimony, this can be incorporated into the classification (rudstone with breccias, for example). When it is not possible, the breccia classification is used. Crystalline limestones, dolomites and silexites are also related to diagenetic processes that tend to eliminate past rock structures. The interpretation of image facies is possible when there is calibration with the rock and with the other profiles, especially the photoelectric factor (PE) and litho-geochemical profiles.

The invention claimed is:

1. A method comprising the following steps:

using a computational script stored on a non-transitory computer-readable medium for treating well images using a Canny Edge Detection algorithm, the computational script comprises the following operations:

applying a 5×5 Gaussian filter to smooth an image of a well and reduce noise in the image;

calculating an image intensity gradient of each pixel in the smoothed image;

removing pixels that do not correspond to an edge of the image based on the image intensity gradient of each pixel:

determining which remaining pixels are true edges based on predefined image intensity gradient upper and lower limits;

highlighting textural and structural variations of rock in an image with the determined true edges; and quantifying edge contrasts by depth based on the determined true edges:

adjusting a tomographic profile depth through correlation between a coregamma curve measured in a laboratory and a reference gamma ray curve of a first profiling run acquiring data in a well;

fine adjusting the tomographic profile depth with correlation of textures and geological surfaces observed in an image profile of the well and in the tomographic profile;

taking lateral samples from pre-established depths of the well;

repositioning of lateral samples, wherein repositioning of the lateral samples comprises determining the exact depth at which the lateral samples were taken based on the image profile of the well;

calibrating different facies through textural and structural comparison between rock data from the lateral samples taken and the image profile of the well;

interpreting facies in the image profile using the highlighted textural and structural variations of rock in the image with the determined true edges from the computational script for treating images; and extrapolating image facies for depths of unsampled intervals between lateral samples of the well.

2. The method of claim 1, wherein the script uses the Canny Edge Detection algorithm through customized parameterizations.

3. The method of claim 1, wherein the script extracts edge contour contrasts observed in the image, wherein the edge contour contrasts comprise image profiles, tomographic image or testimonial photos, and/or lateral sample.

4. The method of claim 1, wherein the script highlights textural and structural variations of the image to assist in interpretation of image facies.

5. The method of claim 1, wherein the predefined image intensity gradient upper and lower limits are defined by the user, to highlight textural and structural variations of the image.

6. The method of claim 1, wherein the script allows removal of artifacts from the image, wherein the artifacts comprise tool marks.

7. The method of claim 1, wherein the image with the determined true edges is viewed individually and/or superimposed on the original.

8. The method of claim 1, wherein the script allows analyzing images of a well sequentially, optionally analyzing the images of the well in terms of their resolution in DPI, height and width in pixels and/or inches.

9. The method of claim 1, wherein data of edge density are exported in a *. txt file and a graph of these data in *. PNG format.

10. The method according to claim 1, further comprising acquisitioning computed tomography and generation of the tomographic profile.

11. The method according to claim 1, wherein the repositioning of the lateral samples is carried out by adjusting depths measured by a probe and marks observed in the image profile.

12. The method according to claim 1, wherein increasing accuracy of the lateral samples repositioning is done by correlating basic petrophysics data and other profiles with marks observed in the image profiles.

13. The method according to claim 1, wherein after calibrating different facies through the textural and structural comparison, the image facies are extrapolated to the entire well.

14. The method according to claim 1, further comprising calibration of the image profile with rock data and integrated analysis with other profiles helps in characterization of the image facies.

15. The method for according to claim 12, wherein the other profiles comprise density, neutron, sonic, caliper, photoelectric factor, resistivity, magnetic resonance, spectral gamma rays, and/or lithogeochemical profiles.

16. The method of claim 1, wherein calculating the image intensity gradient of each pixel in the smoothed image comprises applying a Sobel Kernel filter for each pixel in the smoothed image.

* * * * *